United States Patent
Reed et al.

(10) Patent No.: US 7,150,631 B2
(45) Date of Patent: Dec. 19, 2006

(54) HYBRID ELECTRO-MECHANICAL TRANSMISSION WIRE ISOLATORS WITH THREADED INSERTS

(75) Inventors: William S. Reed, Greenfield, IN (US); Edward L. Kaiser, Rochester Hills, MI (US); Joel E. Mowatt, Zionsville, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/062,895

(22) Filed: Feb. 22, 2005

(65) Prior Publication Data

US 2005/0208782 A1  Sep. 22, 2005

Related U.S. Application Data

(60) Provisional application No. 60/555,270, filed on Mar. 22, 2004, provisional application No. 60/555,141, filed on Mar. 22, 2004.

(51) Int. Cl.
*H01R 33/00* (2006.01)

(52) U.S. Cl. .................................. 439/34; 439/874

(58) Field of Classification Search .................. 439/34, 439/606, 874
See application file for complete search history.

(56) References Cited

U.S. PATENT DOCUMENTS

| | | | | |
|---|---|---|---|---|
| 3,012,159 A | * | 12/1961 | Druesedow | 310/71 |
| 3,440,594 A | * | 4/1969 | Hopp et al. | 439/567 |
| 4,429,243 A | * | 1/1984 | Crow | 310/71 |
| 4,851,725 A | * | 7/1989 | Keck | 310/71 |
| 5,915,544 A | * | 6/1999 | Miyazaki | 200/561 |
| 6,702,612 B1 | * | 3/2004 | Miyazaki et al. | 439/559 |

* cited by examiner

*Primary Examiner*—James R. Harvey
(74) *Attorney, Agent, or Firm*—Christopher DeVries

(57) ABSTRACT

An electrical connector assembly for use in establishing electrical communication between a control module and a motor/generator in a hybrid electro-mechanical transmission includes an insulating wire isolator and nuts nonrotatably preassembled thereto. The electrical connector reduces the quantity of loose parts during transmission assembly. The nuts, being nonrotatably connected to the isolator, which in turn is affixed with respect to a motor housing, are able to accept torque from bolts without assisted retention.

9 Claims, 7 Drawing Sheets

HYBRID ELECTRO-MECHANICAL TRANSMISSION WIRE ISOLATORS WITH THREADED INSERTS

CROSS REFERENCE TO RELATED APPLICATIONS

This application claims the benefit of U.S. Provisional Application No. 60/555,270, filed Mar. 22, 2004 and U.S. Provisional Application No. 60/555,141, filed Mar. 22, 2004, each of which is hereby incorporated by reference in its entirety.

TECHNICAL FIELD

This invention relates to an improved electrical connector for use in establishing an electrical connection between a motor/generator and a control module in a hybrid electro-mechanical transmission.

BACKGROUND OF THE INVENTION

Electrically variable transmissions (EVTs) typically include two electric motor generators each having a respective rotor. EVTs also include a gearing arrangement typically having a plurality of planetary gearsets with respective sun, ring, and planet carrier members. Selectively engageable torque transmitting devices, such as clutches and brakes, selectively interconnect members of the planetary gearsets to each other and to the transmission housing to provide selective power paths from a transmission input shaft to a transmission output shaft.

The rotors are connected to a respective planetary gearset member for unitary rotation therewith so that the transmission is capable of establishing a continuously variable speed ratio between the input and output shafts wherein the speed ratio is proportional to the speed of one of the rotors. An EVT typically includes an energy storage device such as a battery, and an electronic controller connected to both the battery and the motor/generators to control the flow of electrical energy to and from the motor/generators.

Therefore, in assembling EVTs, electrical connections must be established between the electronic controller and each of the motor/generators. However, establishing the electrical connections between the motor/generators and the electronic controller may be difficult due to the complex nature of an EVT and the placement of the motor/generators inside the transmission housing. Moreover, a large number of parts involved in prior art EVT electrical connections results in the assembly of the EVT being labor-intensive.

In connecting motor wires to a control unit, motor wires are typically connected to studs, which are placed in a terminal block. External wire leads from the control unit are fit over the studs and secured with a nut on the stud.

SUMMARY OF THE INVENTION

A motor assembly for a hybrid electro-mechanical transmission includes a motor/generator and an electrical connector assembly. The electrical connector assembly has an isolator member and first and second nuts that are nonrotatably attached to the isolator member. A first conductive path is operatively connected to the motor/generator and has a first terminal defining a first terminal hole. A second conductive path is operatively connected to the motor/generator and has a second terminal defining a second terminal hole. The first nut defines a threaded first nut hole and the second nut defines a threaded second nut hole. The first and second terminals are positioned with respect to the isolator member such that the first terminal hole substantially aligns with the first nut hole and the second terminal hole substantially aligns with the second nut hole.

The electrical connector assembly improves transmission assembly by eliminating the use of loose nuts to clamp together wiring connections to a motor/generator, with a corresponding reduction in the amount of detail assembly required. Loose nuts may be difficult to handle in a mass-production manufacturing environment. Furthermore, since the first and second nuts are nonrotatably attached to the isolator, which in turn is affixed with respect to the motor/generator, the nuts are able to accept torque from a connecting bolt without assisted retention.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
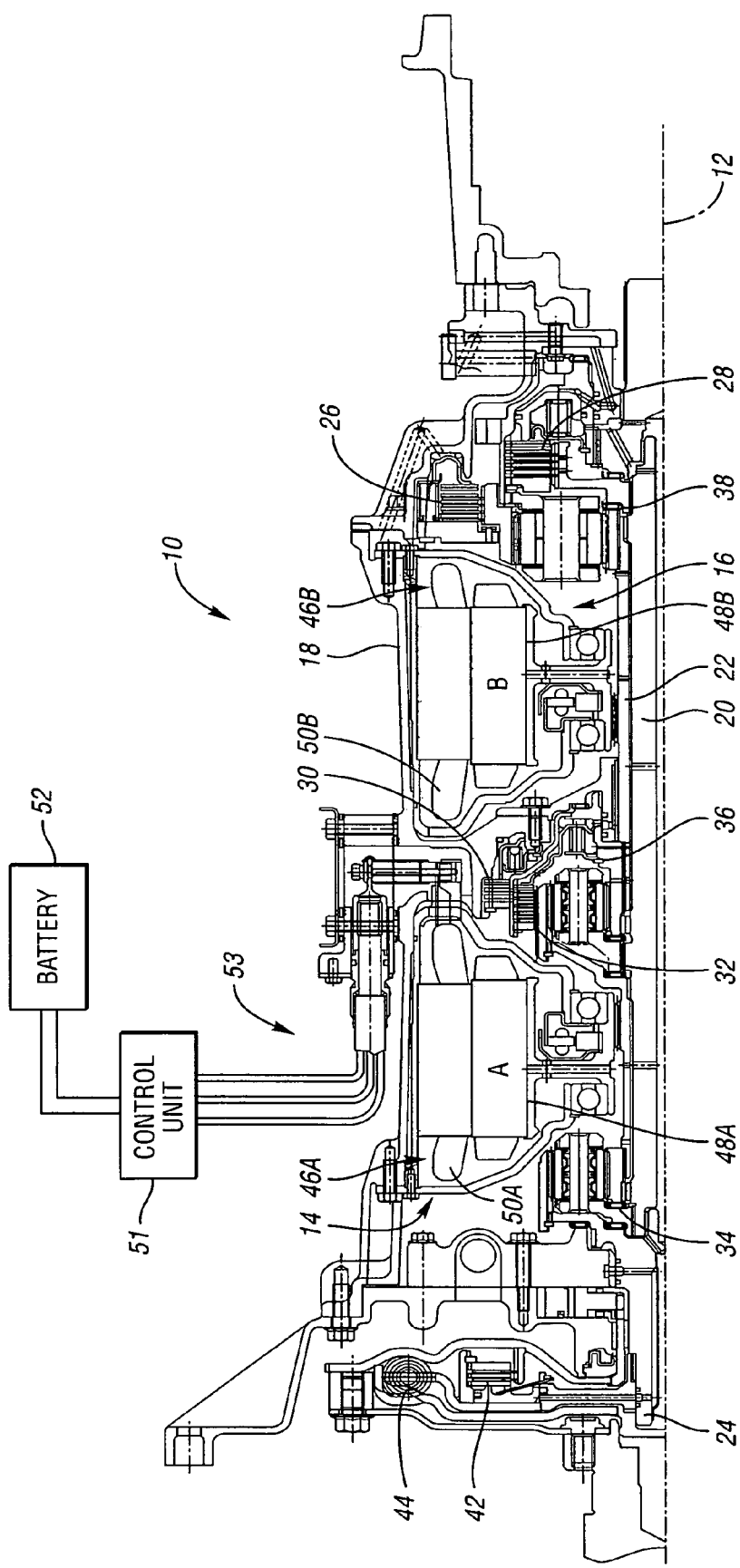
FIG. 1 is a schematic fragmentary cross-sectional view of a hybrid electro-mechanical transmission in accordance with the invention.

Referring to the drawings, wherein like reference numbers refer to like components, FIG. 1 shows the upper half of a transmission 10, in cross sectional view. The lower half of the transmission (not shown) is disposed on the opposite side of center axis 12. First and second electric motor modules 14, 16, respectively, are disposed about the center axis 12 within the transmission 10. A main shaft 20 is longitudinally disposed and rotatable about the center axis 12. A plurality of inner sleeves, such as sleeve 22, are concentrically disposed about the main shaft 20, and are likewise rotatable about the center axis 12. An input shaft 24 is disposed forward of the main shaft 20 and is operable for transferring power from an engine (not shown) to the transmission 10. Engagement of one or more of a plurality of clutches included in the transmission 10 (first, second, third and fourth clutches, 26, 28, 30 and 32 respectively, being shown) interconnects one or more of first, second and third planetary gear sets 34, 36, and 38, respectively, to transfer power at varying ratios to an output member (not shown). As will be readily understood by those skilled in the art, each of the planetary gear sets includes a sun gear member, a planet carrier assembly member and a ring gear member. A fifth clutch, referred to as a lockout clutch 42, is operable for locking out torsion isolator 44 from surrounding structural elements, and to provide a direct connection between the engine and transmission.

Each motor module 14, 16 includes a motor/generator 46A, 46B, respectively. The motor/generators 46A, 46B are preferably three-phase electric motors; however, other motor configurations may be employed within the scope of the claimed invention. Each motor/generator 46A, 46B includes a rotor 48A, 48B, respectively, and a stator 50A, 50B, respectively. Rotor 48A is operatively connected to one of the members of one of the planetary gearsets for unitary rotation therewith, as understood by those skilled in the art. Similarly, rotor 48B is operatively connected to one of the members of one of the planetary gearsets for unitary rotation therewith, as understood by those skilled in the art.

The transmission 10 also includes an electronic controller 51 and an electrical energy storage device 52 such as one or more batteries operatively connected to the controller 51. A plurality of wires 53 interconnect the motor/generators 46A, 46B with the controller 51, which regulates power flow between the motor/generators 46A, 46B, and between the energy storage device 52 and the motor/generators 46A, 46B, as understood by those skilled in the art.

Figure 2:
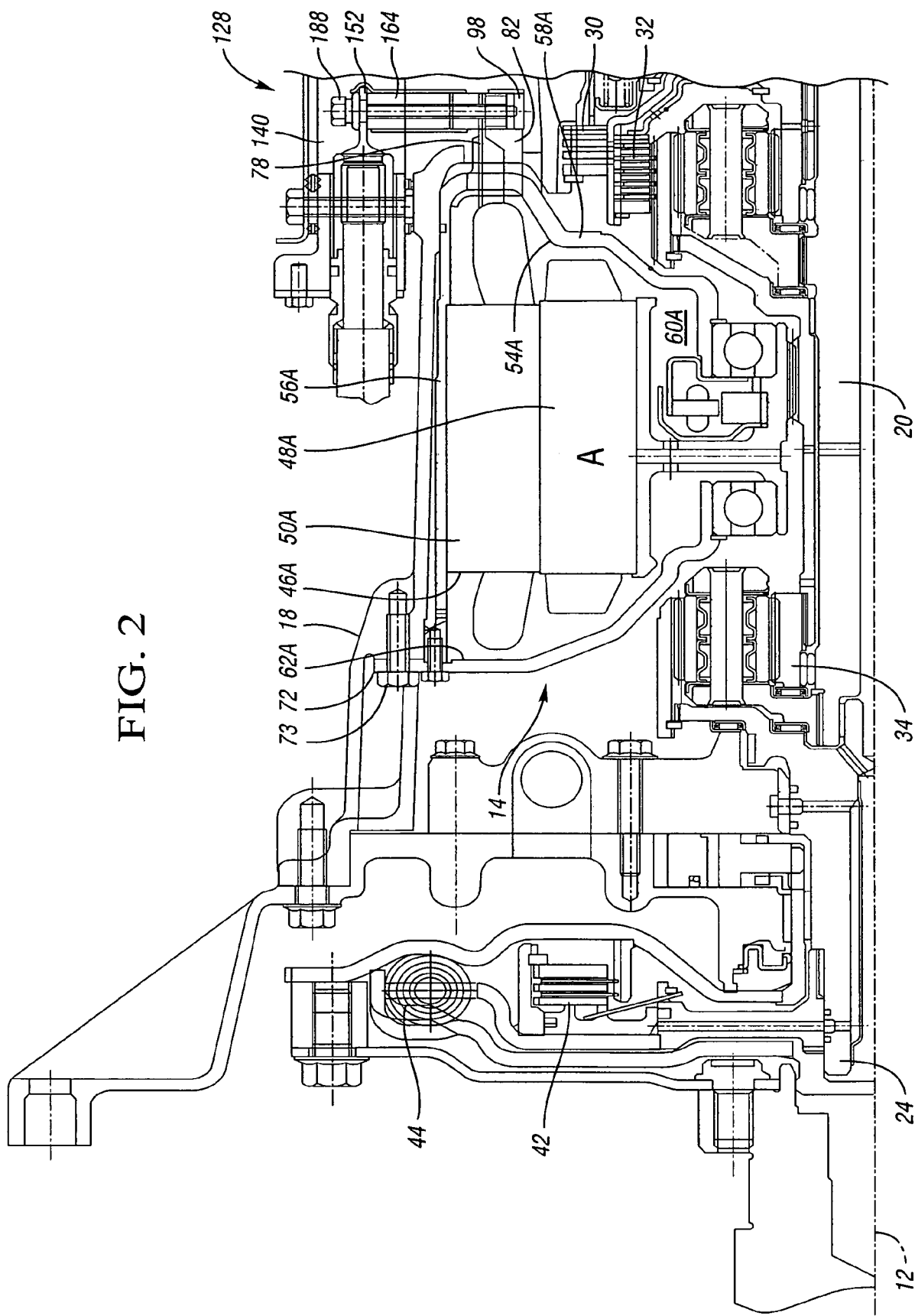
FIG. 2 is a schematic fragmentary cross-sectional view of a frontward portion of the transmission of FIG. 1.
Figure 3:
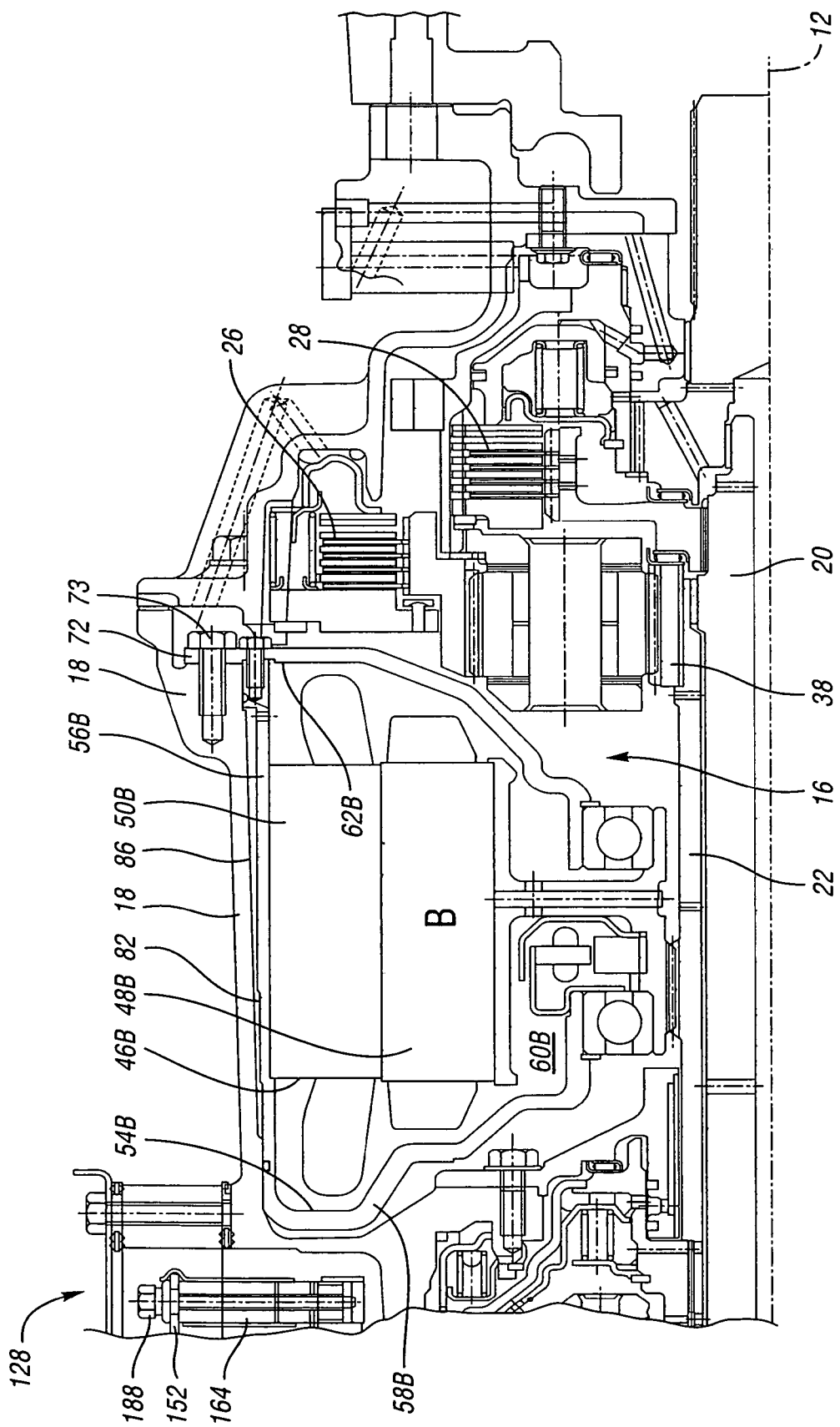
FIG. 3 is a schematic fragmentary cross-sectional view of a rearward portion of the transmission of FIG. 1.

Referring to FIGS. 2 and 3, the first and second motor modules 14, 16, respectively, are each self-contained assemblies. Each module 14, 16 includes a respective module housing 54A, 54B that is preferably a flow-formed drum that includes a generally axially-oriented segment 56A, 56B and a generally radially-oriented segment 58A, 58B that cooperate to define a cavity 60A, 60B that contains the rotor and stator. A stamped module housing cover 62A, 62B is included in each of the modules and is connected to a respective housing 54A, 54B to close cavities 60A, 60B. The modules 14, 16 may be pre-assembled prior to installation in the transmission 10.

Motor module 14 is substantially identical to motor module 16. Although the motor modules have substantially identical components, they are oriented within the transmission in opposite directions along the centerline 12. More specifically, the housing covers 62A, 62B face opposite directions along the transmission centerline 12.

Each housing 54A, 54B includes external mounting tabs 72 radially spaced about the cover at which the housings 54A, 54B are bolted to the transmission housing 18 by bolts 73. The tabs 72 provide easily accessible attachment and assist in aligning the motor modules 14, 16 during assembly to the transmission housing 18.

Figure 4:
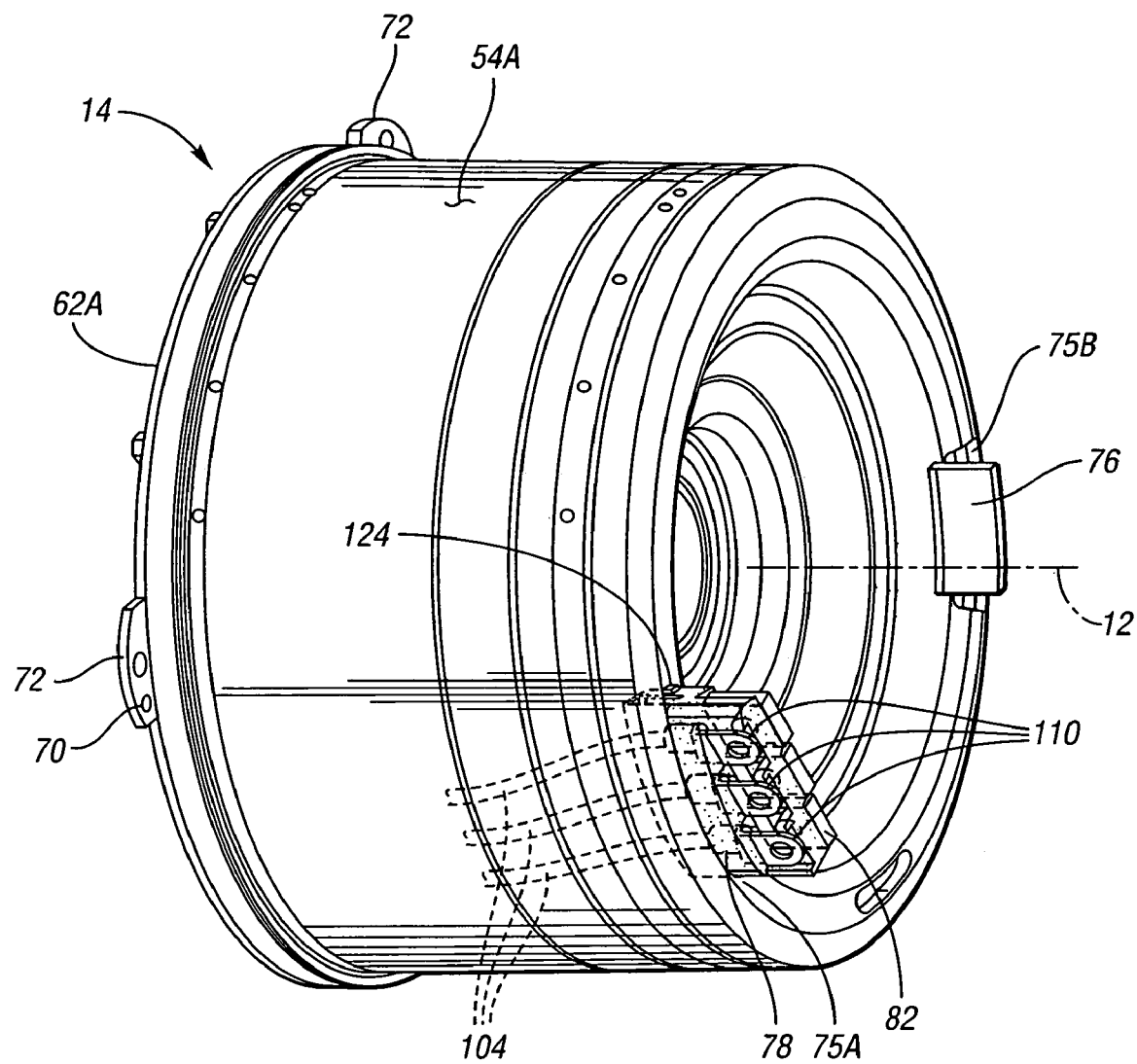
FIG. 4 is a schematic perspective view of a housing and attached cover for a motor module with an electrical connector assembly used in the transmission of FIG. 1.

Referring to FIG. 4, motor module 14 is schematically depicted, and is representative of motor module 16 of FIGS. 1–3. At least one of the mounting tabs 72 on cover 62A preferably includes an alignment hole 70 to ensure proper alignment during the installation of the motor module 14 to the transmission housing. Housing 54A defines access ports 75A, 75B formed at a peripheral edge thereof with lanced tabs 76. An electrical connector assembly 78 is integrated into the motor module 14 by attachment at one of the access ports (shown here attached at access port 75A). More specifically, electrical connector assembly 78 is partially inserted into access port 75A for retention with respect to the module housing 54A.

Figure 5:
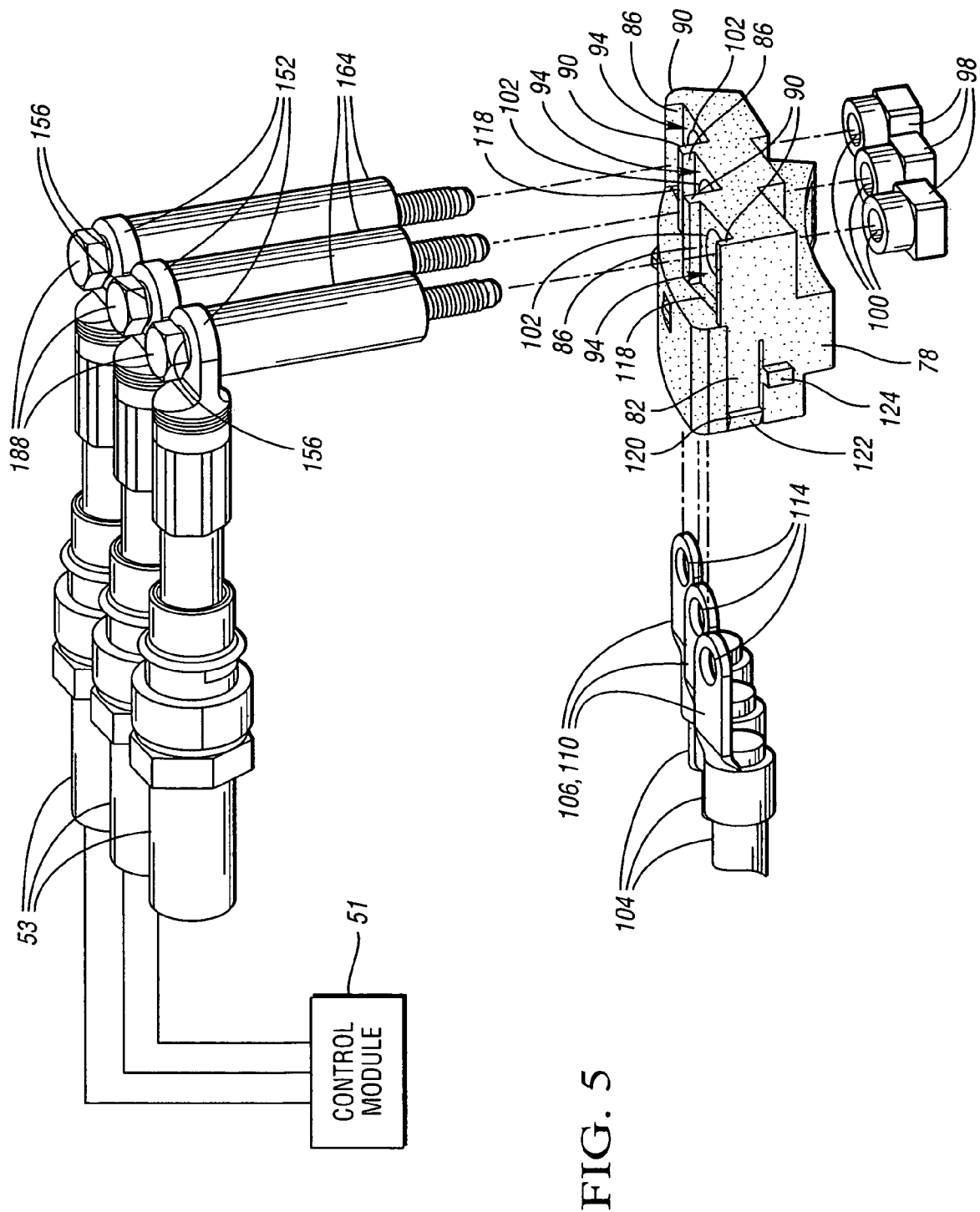
FIG. 5 is a schematic, perspective, partially exploded view of the electrical connector assembly and internal motor wiring of FIG. 4.

Referring to FIGS. 4 and 5, the connector assembly 78 includes an isolator 82. Isolator 82 is a molded piece of highly electrically insulative material, preferably a polymeric material as understood by those skilled in the art. The isolator 82 defines three cavities 86 that are spaced apart from one another and separated by ridges 90. Each cavity 86 is partially formed by a respective generally flat surface 94. The connector assembly 78 also includes three nuts 98 that are insert molded in the isolator 82 so as to be nonrotatably affixed to the isolator 82. Each nut 98 defines a respective threaded hole 100 that aligns with a respective hole 102 formed by the isolator 82 in each of surfaces 94.

The motor module 14 includes three conductive paths which, in the embodiment depicted, are internal wires 104 operatively connected to the stator for transmission of electrical energy to or from the motor module 14. Each wire 104 includes a terminal 106 connected thereto, each terminal 106 including a flat terminal plate 110 with a hole 114 defined therein. The terminals 106 are depicted as being separate pieces connected to the wires 104 so as to be in electrical communication therewith. However, and within the scope of the claimed invention, the terminals may be integrally formed with the wires 104.

Each terminal plate 110 extends through a respective slot 118 in the isolator 82 such that each terminal plate 110 contacts a respective isolator surface 94 and each hole 114 aligns with a respective isolator hole 102 and a respective nut hole 100. It may be desirable for the terminal plates 110 to have a snap-fit connection to the isolator 82 for positive retention of the terminal plates 110 with respect to the connector assembly 78. Each slot 118 is preferably tapered so that a wide end of the slot receives a respective terminal plate 110, and each slot narrows to guide and capture the plate to a constrained final position, as shown in FIG. 4.

The isolator 82 also includes a tab 120 and a stop member 124. Tab 120 includes an inclined surface 122 to allow insertion of the isolator and tab into access port 75A. The tab 120 is configured to prevent removal of the isolator 82 from the access port, and the stop member 124 is configured to prevent overinsertion of the isolator through the access port, through physical part interface with the housing 54A.

Figure 6:
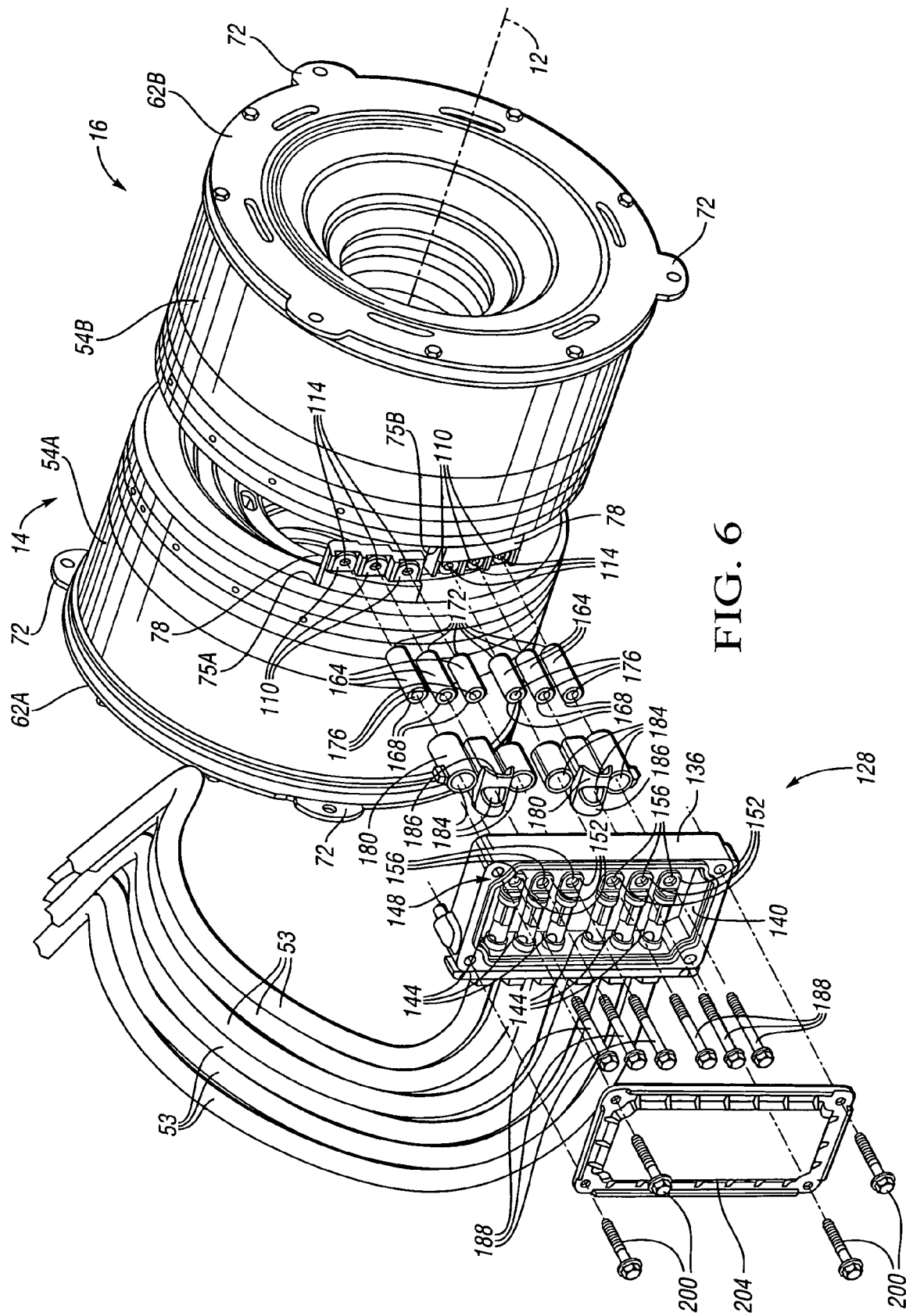
FIG. 6 is a schematic, perspective, partially exploded view of a wiring assembly connecting the electrical connector assemblies of the motor modules of FIGS. 1–3 with a control module.

Referring to FIG. 6, motor module 16 also includes an electrical connector assembly 78 inserted in an access port 75B in module housing 54B. The motor modules 14, 16 are arranged inside a cavity 126 formed in the transmission housing 18, as shown in FIGS. 1–3 and 8, such that the connectors 78 of the first and second motor modules 14, 16 are adjacent to one another and so that terminal plates 110 face radially outward from the centerline 12, and the holes 114 formed by plates 110 are arranged generally linearly at the same axial location in the transmission. This arrangement enables the use of a preassembled terminal subassembly 128 that interconnects the external wiring 53 from the controller to the internal wires 104 (shown in FIG. 4) of each of the motor modules 14, 16.

Terminal subassembly 128 includes a terminal box housing 136 defining a generally rectangular aperture 140. Six circular apertures or ports 144 are formed in the housing 136 and extend from the rectangular aperture 140 to an outer surface of the housing. Each of external wires 53 from the electronic controller is routed through a respective port 144 so that wire terminals 148 at the ends of wires 53 are inside aperture 140. Ports 144 are sealed to prevent moisture or debris from entering the housing 136 when it is attached to the transmission housing. Each terminal 148 includes a flat terminal plate 152 defining a hole 156.

Figure 7:
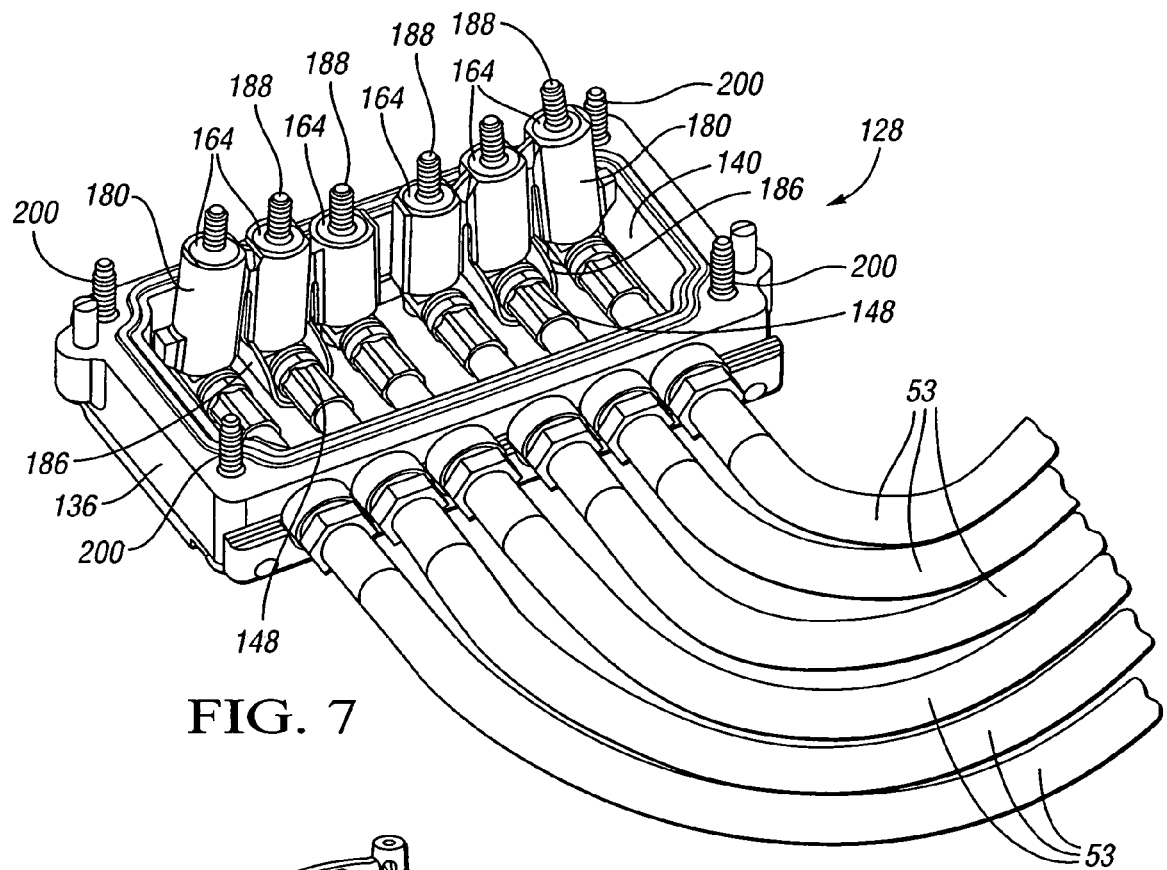
FIG. 7 is a schematic perspective view of the wiring assembly of FIG. 6.
Figure 8:
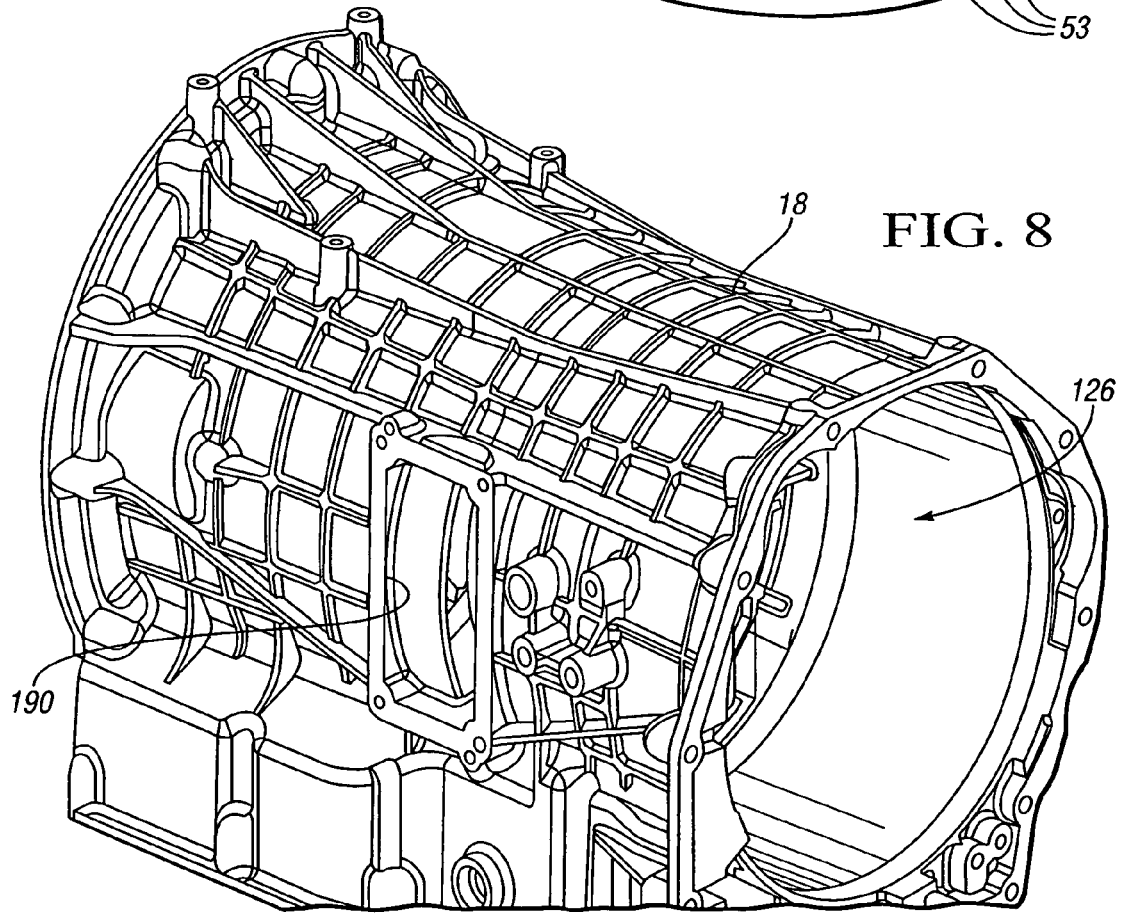
FIG. 8 is a schematic perspective view of the housing of the transmission of FIG. 1.

Referring to FIGS. 6 and 7, preassembled terminal subassembly 128 includes conductive rods, i.e., cylindrical sleeves 164. Each sleeve 164 has a respective first end 168 and a respective second end 172. Each sleeve 164 further defines a cylindrical hole 176 that extends from the first end 168 to the second end 172 of the sleeve 164. The subassembly 128 includes two sleeve insulators 180, which may also be referred to as "terminal shields," and which are formed of a flexible, highly nonconductive material. Each of the insulators 180 defines three cylindrical openings 184 through which a respective sleeve 164 is inserted. The sleeve insulators 180 thus separate and prevent electrical communication between the sleeves, and preferably also provide shock-proofing to the terminal subassembly 128. Each insulator 180 also includes a portion 186 that partially defines a loop through which one of the terminals 148 or wires 53 extends to retain the insulators 180, along with the conductive rods and threaded fasteners, to the terminal box housing 136.

Threaded fasteners, i.e., bolts 188, are used in conjunction with the insulators 180 to connect each sleeve 164 to a respective terminal plate 152 prior to final assembly. More specifically, each of the bolts 188 extends through the hole 156 of one of the terminal plates 152 and through the respective hole 176 of one of the sleeves. Three of the sleeves 164 extend through a respective cylindrical hole 184 in one of the insulators 180, and another three sleeves 164 extend through a respective cylindrical hole 184 in the other of the insulators 180. The fit of the cylindrical sleeves 164 in the cylindrical holes of the isolators 180 keeps the bolts 188, and cylindrical sleeves 164 in place in the terminal assembly 128. The terminal box housing 136 retains the terminals, bolts, and sleeves 164 so that they are substantially linearly arranged and face the same direction for ease of assembly to connectors 78 of the motor modules 14, 16. The terminal subassembly 128, being preassembled prior to connection to connectors 78, facilitates transmission assembly by eliminating loose parts and by forming a module that is selectively movable as a unit with respect to the transmission housing and the motor/generators.

As seen in FIG. 6, the terminal box spaces each of the terminals so that the bolts are alignable with a respective terminal on one of the connectors of modules 14, 16 by sufficiently positioning the terminal subassembly with respect to the modules. To establish the electrical connection between the controller and the motors, the terminal box is aligned with an aperture 190 formed in the transmission housing 18 (shown in FIG. 8) with which the connectors 78 of the motor modules 14, 16 are aligned. The terminal box is affixed to the transmission housing via bolts 200. A gasket is preferably employed with a cover 204 to sealingly close the aperture 190. Each bolt 188 is torqued so as to extend through the hole 114 of a respective terminal plate 110 and extend through and engage the hole 100 of a respective nut 98 (shown in FIG. 5) thereby causing the first end 168 of each sleeve 164 to contact a respective terminal plate 152 and the second end 172 of each sleeve 164 to contact a respective terminal plate 110 on one of the connectors 78 of motor modules 14, 16. More specifically, three of the wires 53 are in electrical communication with the internal wires of motor module 14, and three of the wires 53 are in electrical communication with the internal wires of motor module 16.

While the best modes for carrying out the invention have been described in detail, those familiar with the art to which this invention relates will recognize various alternative designs and embodiments for practicing the invention within the scope of the appended claims.

The invention claimed is:

1. A motor assembly for a hybrid electro-mechanical transmission comprising:

a motor/generator having a rotor and a stator;

an electrical connector assembly including an isolator member and first and second nuts being nonrotatably attached to the isolator member;

a first conductive path operatively connected to the motor/generator and having a first terminal defining a first terminal hole;

a second conductive path operatively connected to the motor/generator and having a second terminal defining a second terminal hole;

wherein said first nut defines a threaded first nut hole and said second nut defines a threaded second nut hole; wherein said first and second terminals are positioned with respect to the isolator member in a final position such that the first terminal hole substantially aligns with the first nut hole and the second terminal hole substantially aligns with the second nut hole;

wherein the isolator member defines two generally tapering slots, and wherein the first and second terminals at least partially extend through a respective one of the two slots; and wherein the two slots are operable to guide and capture the respective first and second terminals in the final position.

2. The motor assembly of claim 1, further comprising a motor housing defining a cavity at least partially containing the motor/generator; and wherein the first and second nuts and the first and second terminals are at least partially outside the cavity.

3. The motor assembly of claim 2, wherein the motor housing defines an aperture, and wherein the isolator member extends through the aperture.

4. The motor assembly of claim 3, wherein the isolator member has a snap-fit connection to the motor housing.

5. The motor assembly of claim 4, wherein the isolator includes a tab and a stop member that retain the isolator with respect to the housing through physical part interference between the stop member, tab, and housing.

6. The motor assembly of claim 1, wherein the isolator member defines two cavities, and wherein the first and second terminals are at least partially located within a respective one of the two cavities.

7. An electrical connector for use with a motor assembly in a hybrid electro-mechanical transmission, the connector comprising:

an isolator defining a first slot, a second slot, a third slot a first surface at least partially defining a first cavity and a first hole, a second surface at least partially defining a second cavity and a second hole, a third surface at least partially defining a third cavity and a third hole;

a first nut defining a fourth hole and being insert molded to the isolator such tat the fourth hole and the first hole are substantially aligned;

a second nut defining a fifth hole and being insert molded to the isolator such tat the fifth hole and the second hole are substantially aligned; and a third nut defining a sixth hole and being insert molded to the isolator such that the sixth hole and the third hole are substantially aligned, wherein the first slot, the second slot and the third slot are generally tapering slots and wherein terminals at least partially extend through a respective one of each of the first slot, second slot and third slot; and wherein the first slot, second slot and third slot are operable to guide and capture the respective terminals in a final position.

8. The electrical connector of claim 7, wherein said first, second, and third surfaces face the same direction as one another.

9. A motor/generator assembly for a hybrid electro-mechanical transmission comprising:
- a motor/generator;
- a motor housing defining an aperture arid defining a cavity at least partially containing the motor/generator;
- an electrical connector assembly including an isolator member extending through the aperture, and first and second nuts being nonrotatably attached to the isolator member such that the first and second nuts are outside the cavity;
- a first terminal defining a first terminal hole; and
- a second terminal defining a second terminal hole;
- wherein said first nut defines a threaded first nut hole and said second nut defines a threaded second nut hole;
- wherein said first and second terminals are positioned with respect to the isolator member in a final position such that the first terminal hole substantially aligns with the first nut hole and the second terminal hole substantially aligns with the second nut hole;
- wherein the isolator member defines two generally tapering slots, and wherein the first and second terminals at least partially extend through a respective one of the two slots; and
- wherein the two slots are operable to guide and capture the respective first and second terminals in the final position.

* * * * *